United States Patent
Szelag et al.

(10) Patent No.: US 12,057,685 B2
(45) Date of Patent: Aug. 6, 2024

(54) CABLE TERMINATING ASSEMBLY WITH ELECTRICALLY INSULATING CUTTING BLADES

(71) Applicant: TE Connectivity Germany GmbH, Bensheim (DE)

(72) Inventors: Martin Szelag, Bickenbach (DE); Tobias Leininger, Mannheim (DE); Franz Mueller, Griesheim (DE); Ole Wiborg, Mainz (DE)

(73) Assignee: TE Connectivity Germany GmbH, Bensheim (DE)

( * ) Notice: Subject to any disclaimer, the term of this patent is extended or adjusted under 35 U.S.C. 154(b) by 571 days.

(21) Appl. No.: 17/331,075

(22) Filed: May 26, 2021

(65) Prior Publication Data
US 2021/0281060 A1 Sep. 9, 2021

Related U.S. Application Data

(63) Continuation of application No. PCT/EP2019/082487, filed on Nov. 25, 2019.

(30) Foreign Application Priority Data

Nov. 26, 2018 (EP) .................................... 18208391

(51) Int. Cl.
| | |
|---|---|
| *H02G 15/076* | (2006.01) |
| *H01R 4/70* | (2006.01) |
| *H01R 4/2416* | (2018.01) |

(52) U.S. Cl.
CPC ............. *H02G 15/076* (2013.01); *H01R 4/70* (2013.01); *H01R 4/2416* (2013.01)

(58) Field of Classification Search
None
See application file for complete search history.

(56) References Cited

U.S. PATENT DOCUMENTS

| | | |
|---|---|---|
| 3,772,635 A | 11/1973 | Frey et al. |
| 5,118,305 A | 6/1992 | Hell et al. |
| 8,801,455 B2 | 8/2014 | Carreras Garcia et al. |

(Continued)

FOREIGN PATENT DOCUMENTS

| | | |
|---|---|---|
| CN | 1099511 A | 1/2003 |
| CN | 102439793 A | 5/2012 |

(Continued)

OTHER PUBLICATIONS

Japanese Office Action, Application No. 2021-528899, Dated: Jun. 7, 2022, 10 pages.

(Continued)

*Primary Examiner* — Xanthia C Relford
(74) *Attorney, Agent, or Firm* — Barley Snyder

(57) ABSTRACT

A cable terminating assembly for terminating a cable having a wire includes a wire manager having an end face facing in an insertion direction and a connector housing with a reception opening receiving at least a part of the wire manager. The end face holds the wire in a predetermined (Continued)

position along the insertion direction. The connector housing has a cutting blade formed by an electrically insulating material. The cutting blade cuts the wire upon insertion of the wire manager into the connector housing.

17 Claims, 5 Drawing Sheets

(56) References Cited

U.S. PATENT DOCUMENTS

| | | | | |
|---|---|---|---|---|
| 11,672,093 | B2* | 6/2023 | Tian | H05K 5/0247 |
| | | | | 174/652 |
| 2002/0187667 | A1* | 12/2002 | Kitagawa | H01R 35/04 |
| | | | | 439/131 |
| 2004/0137784 | A1 | 7/2004 | Martin | |
| 2006/0035528 | A1* | 2/2006 | Bryan | H01R 43/015 |
| | | | | 439/676 |
| 2010/0030217 | A1* | 2/2010 | Mitusina | A61B 17/32002 |
| | | | | 606/180 |
| 2011/0022069 | A1* | 1/2011 | Mitusina | A61B 17/32002 |
| | | | | 606/180 |
| 2011/0297437 | A1 | 12/2011 | Zeng | |
| 2012/0058667 | A1 | 3/2012 | Carreras Garcia et al. | |
| 2012/0217387 | A1* | 8/2012 | Loucks, Jr. | H01J 49/067 |
| | | | | 250/282 |
| 2015/0162670 | A1* | 6/2015 | Galla | H01R 43/01 |
| | | | | 29/872 |
| 2016/0362954 | A1* | 12/2016 | Hansen | E21B 27/005 |
| 2017/0264044 | A1* | 9/2017 | Jarzebiak | H01R 4/2433 |

FOREIGN PATENT DOCUMENTS

| | | |
|---|---|---|
| CN | 102834976 A | 12/2012 |
| CN | 104737378 A | 6/2015 |
| CN | 105575549 A | 5/2016 |
| EP | 0631344 A2 | 12/1994 |
| EP | 2089937 A2 | 8/2009 |
| EP | 2218142 B1 | 2/2012 |
| EP | 2559106 A1 | 2/2013 |
| JP | S5323948 B | 3/1978 |
| JP | H722079 A | 1/1995 |
| WO | 9918299 A1 | 4/1999 |
| WO | 2014016540 A1 | 1/2014 |

OTHER PUBLICATIONS

PCT International Search Report and Written Opinion, dated Feb. 5, 2020, 15 pages.
European Examination Report dated Sep. 27, 2022 corresponding to Application No. 18 208 391.5-1201, 7 pages.
First Office Action from CNIPA dated Sep. 15, 2022 corresponding to Application No. 201980077289.8, and English translation thereof, 17 pages.

* cited by examiner

CABLE TERMINATING ASSEMBLY WITH ELECTRICALLY INSULATING CUTTING BLADES

CROSS-REFERENCE TO RELATED APPLICATIONS

This application is a continuation of PCT International Application No. PCT/EP2019/082487, filed on Nov. 25, 2019, which claims priority under 35 U.S.C. § 119 to European Patent Application No. 18208391.5, filed on Nov. 26, 2018.

FIELD OF THE INVENTION

The present invention relates to a terminating assembly and, more particularly, to a cable terminating assembly with electrically insulating cutting blades.

BACKGROUND

Cable terminating assemblies for terminating a cable comprising at least one wire, in particular multiple twisted wire pairs, often require the at least one wire to be pushed into openings in one end of a connector housing until they contact a terminal of the connector. Excessive length of the at least one wire has to be sheared off and the remaining wire needs to be electrically insulated in order to securely terminate the cable and prevent any short circuit. There is a high demand for a miniaturization and reduction of costs of such a cable terminating assembly.

SUMMARY

A cable terminating assembly for terminating a cable having a wire includes a wire manager having an end face facing in an insertion direction and a connector housing with a reception opening receiving at least a part of the wire manager. The end face holds the wire in a predetermined position along the insertion direction. The connector housing has a cutting blade formed by an electrically insulating material. The cutting blade cuts the wire upon insertion of the wire manager into the connector housing.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
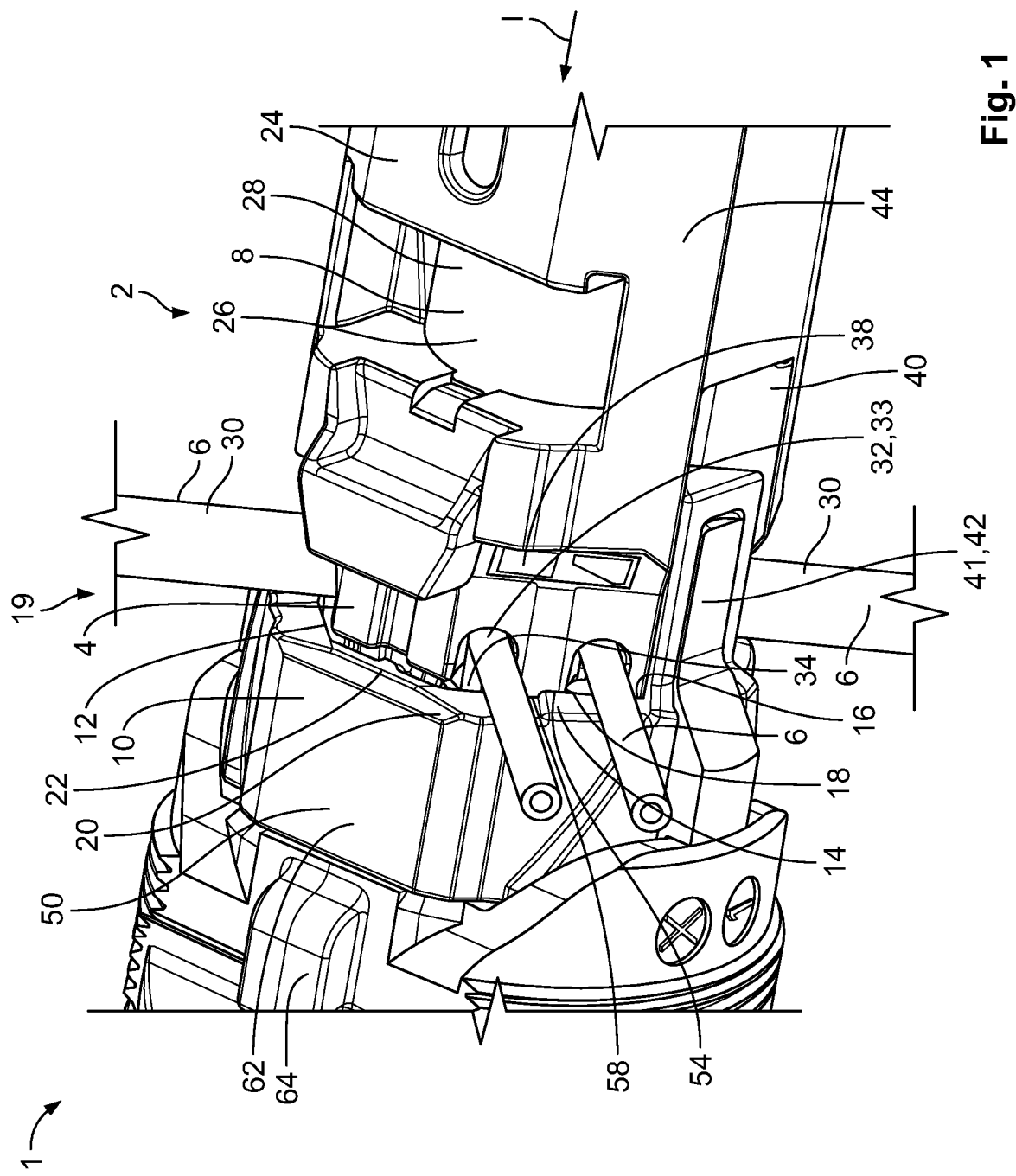
FIG. 1 is a perspective view of a cable terminating assembly according to an embodiment.

According to the following description of the various aspects and embodiments, elements shown in the drawings can be omitted if the technical effects of these elements are not needed for a particular application, and vice versa: i.e. elements that are not shown or described with reference to the figures but are described herein can be added if the technical effect of those particular elements is advantageous in a specific application. In the figures, the same reference numerals are used for elements which correspond to one another in terms of their function and/or structure.

Figure 2:
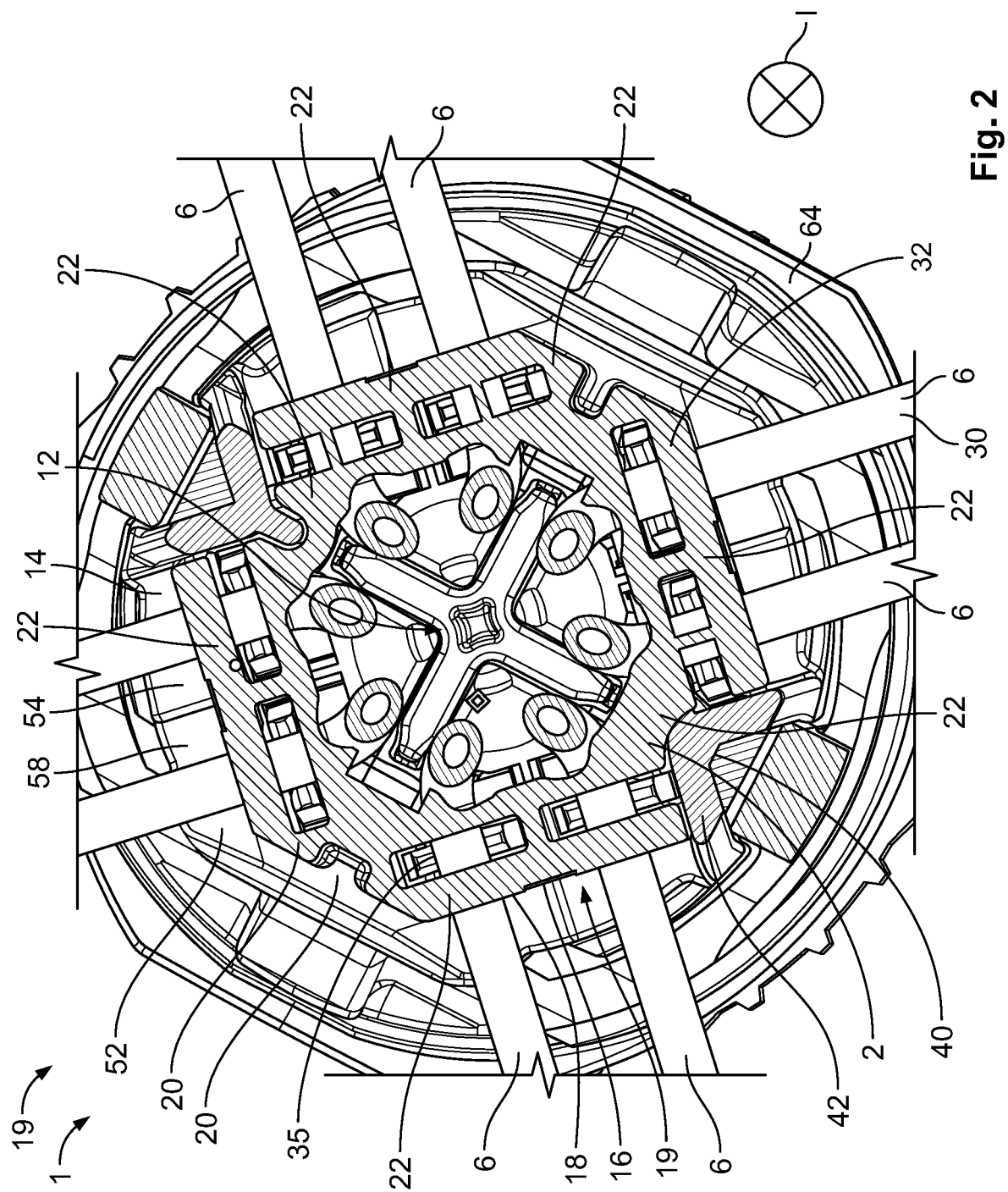
FIG. 2 is a sectional perspective view of the cable terminating assembly.

FIG. 1 shows a schematic perspective view of a cable terminating assembly 1 according to the invention and FIG. 2 shows a profile view of the cable terminating assembly 1. The cable terminating assembly 1 comprises a wire manager 2 with an end face 4 facing in an insertion direction I adapted to hold a wire 6 of a cable 8 in a predetermined position. The cable terminating assembly 1 further comprises a connector housing 10 with a reception opening 12 for receiving at least a part of the wire manager 2 along the insertion direction I.

In this exemplary embodiment, the cable 8 has four pairs of twisted wires 6. The wires 6 have been untwisted in FIGS. 1 and 2 and the wire manager 2 holds each wire 6 in a predetermined position on the end face 4.

The wires 6 protrude radially from the end face 4, as shown in FIGS. 1 and 2, and have to be cut to length when inserting the wire manager 2 into the connector housing 10. For this, the connector housing 10 has cutting blades 14 arranged correspondingly to the predetermined positions of the wires 6. The predetermined position in which the at least one wire 6 is held may be located opposite the at least one cutting blade 14. During the insertion, the cutting blades 14 shear off the excessive length of the wires 6.

The cutting blades 14 are formed by an electrically insulating material, such as an insulating resin material or a ceramic material, so that the wires 6 that have been cut to length by the cutting blades 14 of the connector housing 10 are further electrically insulated, rendering the need for a further insulation feature unnecessary. In an embodiment, the at least one cutting blade 14 may be formed by a nanometer fiber reinforced resin material and/or a glass fiber reinforced resin material.

FIG. 2 shows a profile view of the cable terminating assembly 1 from the perspective of the insertion direction I. The excesses of the length of the wires 6 is sheared off by an interaction between an outer edge 16 of the end face 4 and a cutting edge 18 of the cutting blades 14 that glide passed each other when inserting the wire manager 2 into the reception opening 12 of the connector housing 10. Hence, the outer edge 16 and the cutting edge 18 form a shearing assembly 19.

Both the connector housing 10 and the wire manager 2 comprise an annular shape in an embodiment, more specifically a polygonal shape in the form of a octagon 20 in the embodiment shown in FIGS. 1 and 2. The profile perpendicular to the insertion direction I may comprise a polygonal shape. Each pair of twisted wires 6 is positioned on a side 22 of the octagon 20 arranged essentially perpendicular to the other sides 22, so that the pairs of twisted wires 6 are positioned in a cross formation and distanced from one another, reducing the possibility of a wrongful positioning of the wires 6. In other words, a pair of twisted wires 6 is arranged in every second side 22 of the octagon 20, so that the adjacent pairs of twisted wires 6 along the circumference are essentially perpendicular to one another. Depending on the number of wires 6 in the cable 8, any other polygonal form may be acceptable such as a hexagonal or dodecagonal form.

In addition to the facilitated correct positioning of the wires, the annular shape, in particular the octagonal shape 20 of the connector housing 10 may increase the tension equalization capabilities of the connector housing 10. Due to the annular and/or polygonal shape, an even force flow is acquired, during the insertion of the wire manager 2 into the reception opening 12. The annular shape and/or polygonal shape may prevent and/or minimize a deflection of the cutting blades 14 during the insertion of the wire manager 2 into the reception opening 12.

The wire manager 2 is explained in more detail with reference to FIG. 3 and FIG. 4, which show a perspective view of the wire manager 2 according to the invention. In FIG. 4, the wire manager 2 is shown holding multiple wires 6 of a cable 8.

The wire manager 2, as shown in FIG. 4, has a longitudinal body 24 extending essentially parallel to the insertion direction I from the end face 4 to a front face. A cable tunnel 26 for inserting the cable 8 with the at least one wire 6 extends from the end face 4 to the front face in the form of a through hole 28. The cable 8 can be inserted into the cable tunnel 26, whereby an insulation of the cable 8 is removed prior to inserting the cable 8. The cable 8 may comprise multiple different wires 6, in an embodiment pairs of twisted wires 6. Free ends 30 of the wires 6 protrude from the cable tunnel 26 at the end face 4 and are bent essentially perpendicularly, so that the free ends 30 of the wires 6 extend essentially parallel to the end face 4 of the wire manager 2. The excessive length of the wires 6 extends beyond the outer circumference of the end face 4 and needs to be sheared off, during insertion of the wire manager 2 into the connector housing 10.

Figure 3:
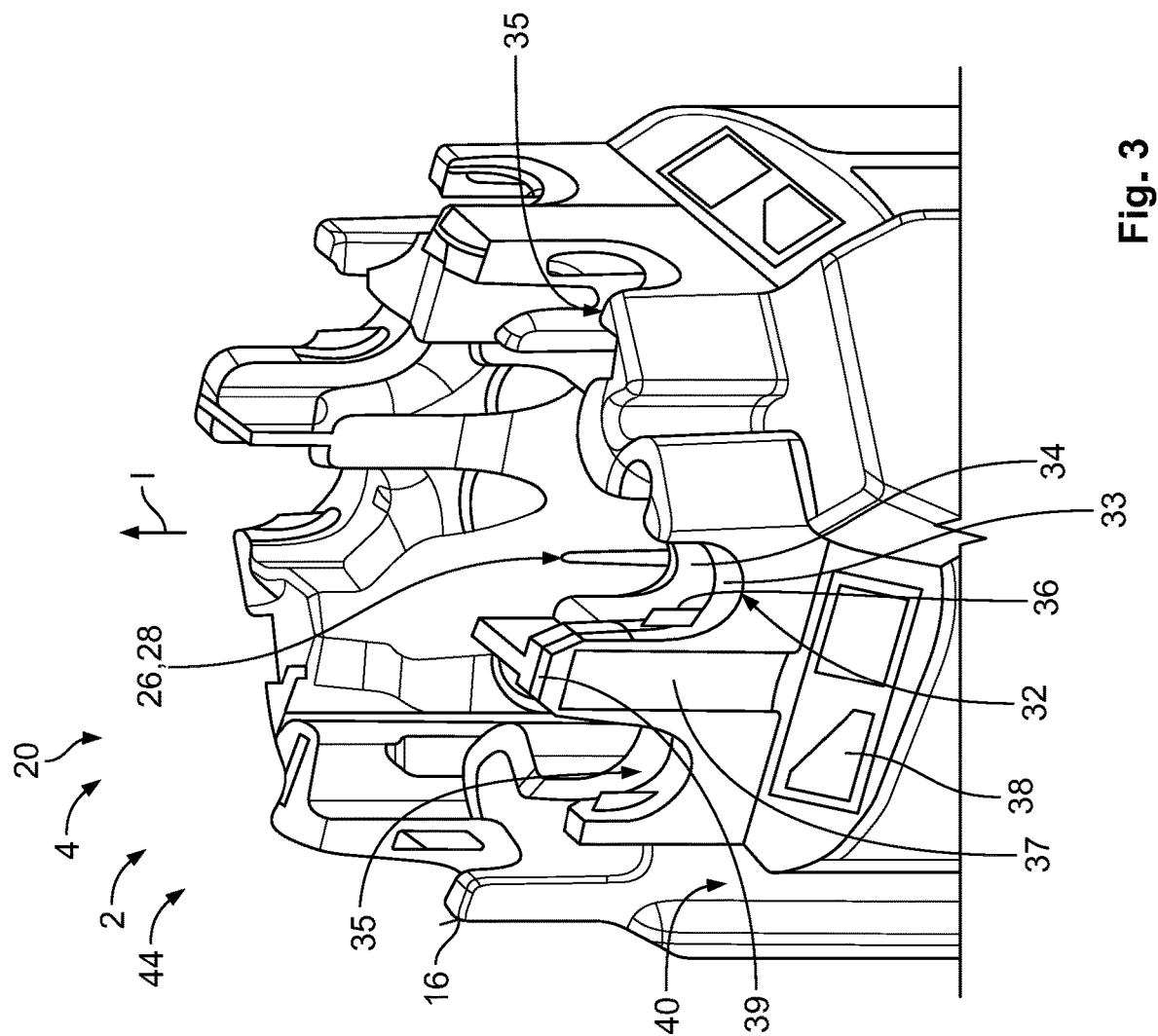
FIG. 3 is a perspective view of a wire manager of the cable terminating assembly.
Figure 4:
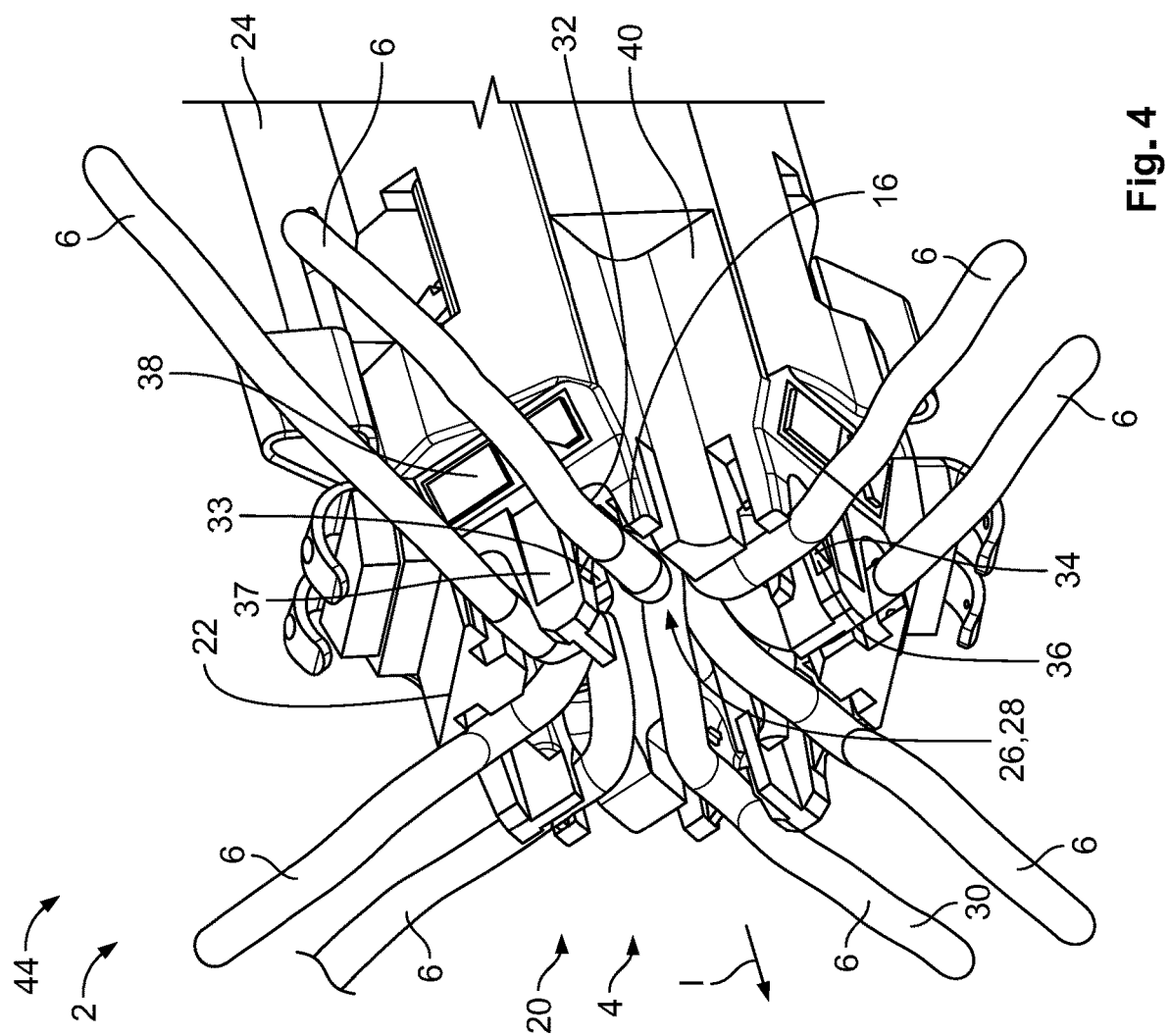
FIG. 4 is a perspective view of the wire manager holding a plurality of wires.

Essentially U-shaped wire holders 32, shown in FIGS. 3 and 4, are provided on the end face 4 of the wire manager 2 for holding the wires 6 in the predetermined position. For each wire 6, a corresponding wire holder 32 is provided. Two wire holders 32 are arranged adjacent to one another on a side 22 along the circumference of the polygonal shape, in this exemplary embodiment the octagon 20. Four pairs of wire holders 32 are arranged in a rectangular arrangement, i.e. every second side 22 of the octagon is provided with a pair of wire holders 32. Therefore, a pair of wires can be positioned on one side 22 of the octagon 20, whereby each wire 6 of the pair is held by a different wire holder 32.

The wire holders 32, as shown in FIGS. 3 and 4, have a slot 34 in which the wires 6 may be seated. For further increasing the holding force with which the wires 6 are held in the predetermined position, the wire holders 32 may feature retention blades 36. The retention blades 36 are adapted to at least partially cut into an insulation of the wires 6 to further secure the fastening of the wires 6 to the wire manager 2. The retention blades 36 are, in an embodiment, arranged on each side of the slot 34. Hence, the wire holders 32 may be formed similarly to an insulation displacement contact. As the retention blades 36 are not intended for forming an electrical connection, the retention blades 36 do not necessarily need to cut through the insulation of the wires 6 so that they contact the conductive cores of the wires 6. Quite to the contrary, an electrical connection between the retention blades 36 and the wires 6 is not desired. Therefore, an insulating material such as a glass fiber reinforced resin material in an embodiment forms the retention blades 36 and/or the retention blades 36 only partially cut into the insulation of the wires 6.

The wire holders 32 comprise two U-shaped seats 33, which are radially distanced from one another, so that a gap 35 is formed between the two seats 33, as shown in FIG. 3. The gap 35 may be adapted to receive a contact terminal arranged in the connector housing 10 to electrically contact the wires 6. The contact terminal may, for example, be formed as an insulation displacement contact with conductive blades that cut through the insulation of the wires 6 and electrically contact the conductive core. The two U-shaped seats 33 may function as a bearing creating a back-pressure for the at least one wire 8 balancing an insertion force, when the at least one wire 6 is pushed against the contact terminal.

As shown in FIGS. 3 and 4, a separation column 37 extending in the insertion direction I beyond the wire holders 32 may separate the adjacent wire holders 32 arranged on the same side 22. The separation column 37 has a tapered tip 39 and may be used for the separation of twisted wires. This provides a better and faster handling, as normally one needs to untwist the wire pairs completely. With the separation column 37, it is possible to splice the pair by putting the wires 6 over the separation column 37 after only half a turn.

Coding features 38, such as a color scheme and/or symbols, may be provided in order to determine the position in which the different wires have to be held. The coding features 38 may be provided on each side 22 of the octagon 20 which comprise wire holders 32, as shown in FIGS. 3 and 4. The coding features 38 may ensure a correct positioning of the different wires 6 and may further serve to fool proof the cable terminating assembly 1.

On two opposing sides 22 of the octagon 20, which are not provided with wire holders 32, a guiding slot 40 may be formed. The guiding slot 40 may extend along the insertion direction I and may be open at the end face 4 for receiving a complementary formed guiding feature 41, e.g. a guiding post 42 (see FIGS. 1 and 5). Hence, the rotational position in which the wire manager 2 may be inserted into the reception opening 12 is predetermined and it may be ensured that the wires 6 are terminated in the correct position. In an embodiment, for further stabilization, at least two guiding features 41 and corresponding slots 40 may be provided, which are arranged on opposing sides of the polygonal shape 20.

The wire manager 2 may be formed as a monolithic part 44 in an embodiment, e.g. as a molded, in particular injection molded piece. In an embodiment, a nanometer and/or glass fiber reinforced material with a high elastic modulus of about 16000 forms the monolithic part 44.

Figure 5:
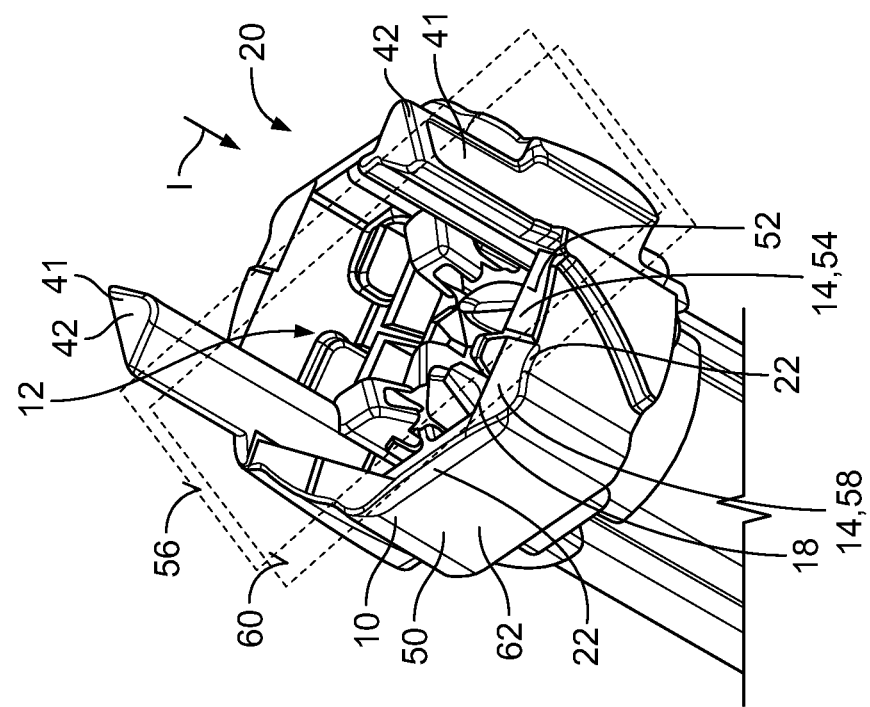
FIG. 5 is a perspective view of a connector housing of the cable terminating assembly.

In the following, the connector housing 10 according to an exemplary embodiment is described in detail with reference to FIG. 5. FIG. 5 shows a perspective view of an inventive connector housing 10. The connector housing 10 has an annular shaped, and in an embodiment an octagonal shaped sleeve 50 surrounding the reception opening 12 for at least partially receiving the wire manager 2 in the insertion direction I.

In the reception opening 12, contact terminals for electrically contacting the wires 6 may be provided. The contact terminals may be formed as insulation displacement contacts and be arranged opposite to the gaps 35 on the end face 4 of the wire manager 2. The reception opening 12 may be formed complementary to the end face 4 of the wire manager 2, so that the end face 4 of the wire manager 2 may be fittingly inserted into the reception opening 12.

As shown in FIG. 5, the cutting blades 14 are formed on a front face 52 of the sleeve 50 opposite the predetermined position of the wires 6 in the insertion direction I. In an embodiment, the number and arrangement of the cutting blades 14 corresponds to the number and arrangement of the wire holders 32. Each wire holder 32 may be arranged opposite to a cutting blade 14, so that there exists a corresponding cutting blade 14 to each wire holder 32. The at least one wire holder 32 may be radially offset from the at least one cutting blade 14, preventing any damage to the wire holder 32 and/or cutting blade 14 during insertion.

Guiding posts 42 extend essentially parallel to and against the insertion direction I from the front face 52 correspondingly to the guiding slots 40 of the wire manager 2, as shown in FIG. 5. Therefore, the rotational position of the connector housing 10 and the wire manager 2 relative to one another may be determined. The wire manager 2 may be inserted in two different rotational positions, wherein in one position the wire manager 2 is turned 180 degree relative to the other position.

Figure 6:
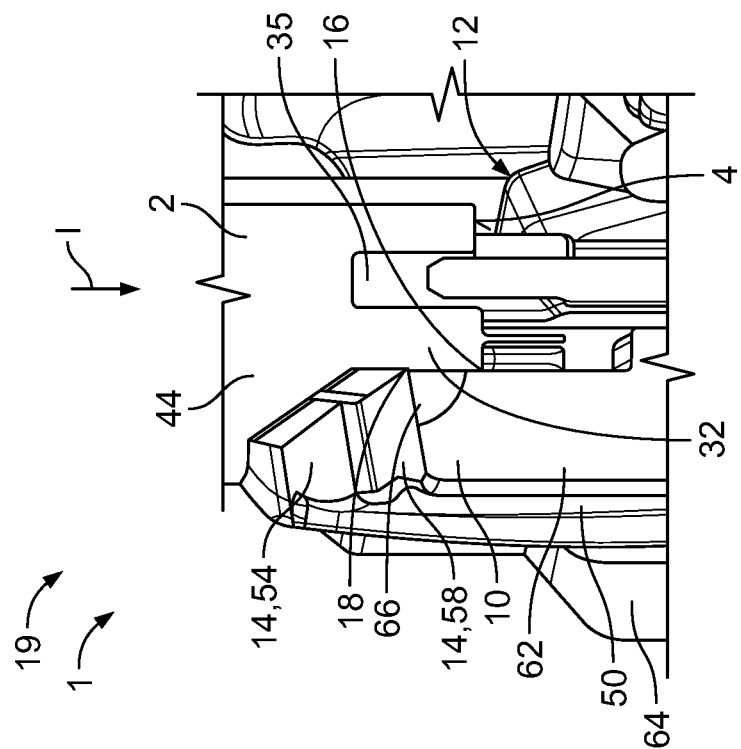
FIG. 6 is a sectional perspective view of the cable terminating assembly.

A pair of cutting blades 14 is arranged adjacent on the same side 22 of the octagon 20, as shown in FIGS. 5 and 6. The at least two cutting blades 14 may be arranged adjacent to one another along the circumference of the connector housing 10. In order to reduce the cutting force peak, a first cutting blade 54 of the pair is arranged in a first plane 56 essentially perpendicular to the insertion direction I and a second cutting blade 58 of the pair is arranged in a second plane 60 distanced from the first plane 56 in the insertion direction I. The first and second cutting blades 54, 58 may be arranged adjoining to one another along the circumference of the sleeve 50. Consequently, during the insertion of the wire manager 2, a timely offset is provided for shearing the adjacent wires 6. Hence, the insertion force peak may be reduced.

As shown in FIGS. 5 and 6, the connector housing 10 may be formed as a monolithic component 62 with the cutting blades 14. The connector housing 10, in particular the cutting blades 14 may be formed of a glass fiber reinforced resin material with a high elastic modulus of about 16000. A high elastic modulus may prevent a deformation of the cutting blades 14 and therefore increase the wear resistance and number of possible mating cycles. The annular-shaped form may further increase the wear resistance, since the annular shape promotes the tension equalization and further prevents a deflection of the cutting blades 14.

As can be seen in FIG. 1, the connector housing 10 may at least partially be encased in a second outer housing 64, e.g. a die cast part, for further stabilizing the connector housing 10.

FIG. 6 displays a schematic cut view of an inventive cable terminating assembly 1. The cutting blade 14 has a cutting edge 18 formed on the front face 52 of the sleeve 50 facing the end face 4 of the wire manager 2. The cutting edge 18 glides past the outer edge 16 of the end face 4. The interaction between the cutting edge 18 and the outer edge 16 leads to the shearing of the excessive part of the wire 6.

In order to further increase the wear resistance of the cable terminating assembly 1, in particular of the connector housing 10, the cutting edge 18 may comprise a bevel angle 66 shown in FIG. 6 of about 90°. A bevel angle 66 of about 90° further prevents a deflection of the at least one cutting blade 14 during shearing off the at least one wire 6, increasing the number of mating cycles of the cable termination assembly 1.

By having the cutting blades 14 formed of an electrically insulating material, the cutting blades both cut the wires 6 to length and electrically insulate the wires 6. In this exemplary embodiment, only two parts, the wire manager 2 and the connector housing 10 are necessary to cut eight wires 6. The cable terminating assembly 1 provides a compact and cost effective design.

What is claimed is:

1. A cable terminating assembly for terminating a cable having a wire, comprising:
    a wire manager having an end face facing in an insertion direction, the end face holding the wire in a predetermined position along the insertion direction; and
    a connector housing with a reception opening receiving at least a part of the wire manager, the connector housing has a cutting blade formed by an electrically insulating material, the cutting blade cutting the wire upon insertion of the wire manager into the connector housing.

2. The cable terminating assembly of claim 1, wherein the wire manager and/or the connector housing has an annular shape.

3. The cable terminating assembly of claim 2, wherein the wire manager and/or the connector housing has a polygonal shape.

4. The cable terminating assembly of claim 1, wherein at least one of the wire manager and the connector housing has a guiding feature extending essentially parallel to the insertion direction.

5. The cable terminating assembly of claim 4, wherein the other of the wire manager and the connector housing has a guiding slot formed complementary to the guiding feature.

6. The cable terminating assembly of claim 1, wherein the wire manager has a wire holder holding the wire in the predetermined position.

7. The cable terminating assembly of claim 6, wherein the wire holder has a retention blade at least partially cutting into an insulation of the wire.

8. The cable terminating assembly of claim 7, wherein the retention blade is formed of the electrically insulating material.

9. The cable terminating assembly of claim 6, wherein the wire holder is located opposite the cutting blade in the insertion direction.

10. The cable terminating assembly of claim 6, wherein the wire manager has a pair of adjacent wire holders separated from one another by a separation column.

11. The cable terminating assembly of claim 1, wherein the cutting blade is formed by a fiber reinforced material.

12. The cable terminating assembly of claim 1, wherein the cutting blade is a first cutting blade arranged in a first plane essentially perpendicular to the insertion direction.

13. The cable terminating assembly of claim 12, wherein the connector housing has a second cutting blade arranged in a second plane distanced from the first plane in the insertion direction.

14. The cable terminating assembly of claim 13, wherein the first cutting blade and the second cutting blade are adjacent to one another along a circumference of the connector housing.

15. The cable terminating assembly of claim 1, wherein the cutting blade has a cutting edge with a bevel angle of about 90°.

16. The cable terminating assembly of claim 1, wherein the connector housing and the cutting blade are formed together as a monolithic component.

17. The cable terminating assembly of claim 1, wherein the connector housing is at least partially encased in an outer housing.

* * * * *